United States Patent [19]

McCabe et al.

[11] 4,315,436

[45] Feb. 16, 1982

[54] FLOW-RATE TRANSDUCER WITH ELECTRICAL OUTPUT

[75] Inventors: Garry-Owen McCabe, New Hartford; William P. Milish, Bristol, both of Conn.

[73] Assignee: Transamerica DeLaval Inc., Princeton, N.J.

[21] Appl. No.: 158,869

[22] Filed: Jun. 12, 1980

Related U.S. Application Data

[63] Continuation-in-part of Ser. No. 117,791, Feb. 1, 1980.

[51] Int. Cl.³ .............................................. G01F 1/24
[52] U.S. Cl. .................................................. 73/861.54
[58] Field of Search ............ 73/861.53, 861.54, 861.58

[56] References Cited

U.S. PATENT DOCUMENTS 2,069,309  2/1937  Henszey ........................... 73/861.54
2,727,388 12/1955  Ekstrom ........................... 73/861.54
3,253,459  5/1966  Sorenson et al. ................. 73/861.54

Primary Examiner—Herbert Goldstein
Attorney, Agent, or Firm—Hopgood, Calimafde, Kalil, Blaustein & Judlowe

[57] ABSTRACT

The invention in a preferred form contemplates a valve-like structure adapted for series-connection in a pipe or other conduit line and having a valve member which is caused, within the constraint of a rectilineal guide, to change its longitudinal position as a substantially linear function of the change of fluid-flow rate in the pipe or conduit; and an inductive device tracks the position of the valve member to produce an electrical output signal which is also a substantially linear function of the fluid-flow rate. The description includes unidirectional embodiments (with check-valve action for flow in the non-metering direction), and a bi-directional embodiment.

17 Claims, 13 Drawing Figures

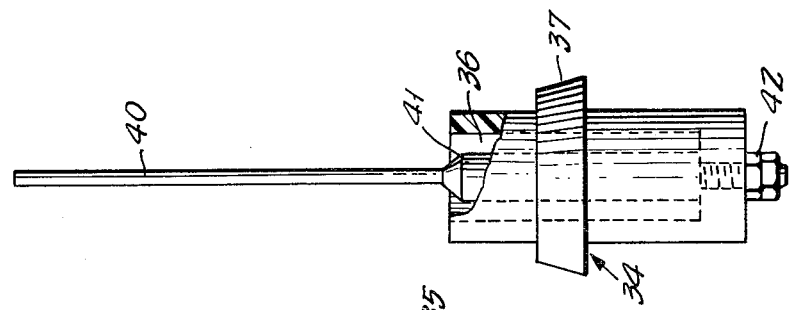
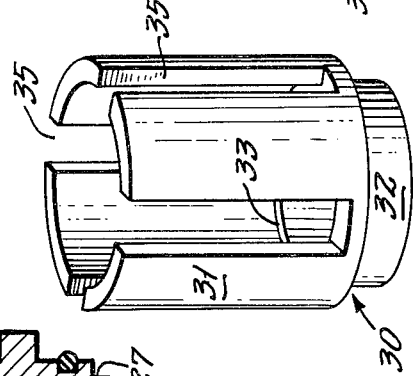
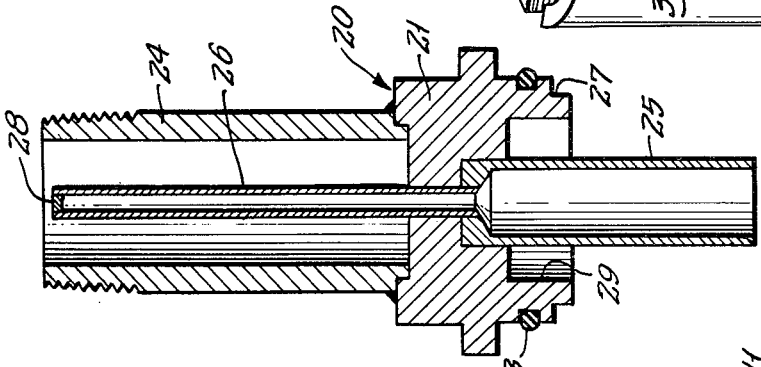
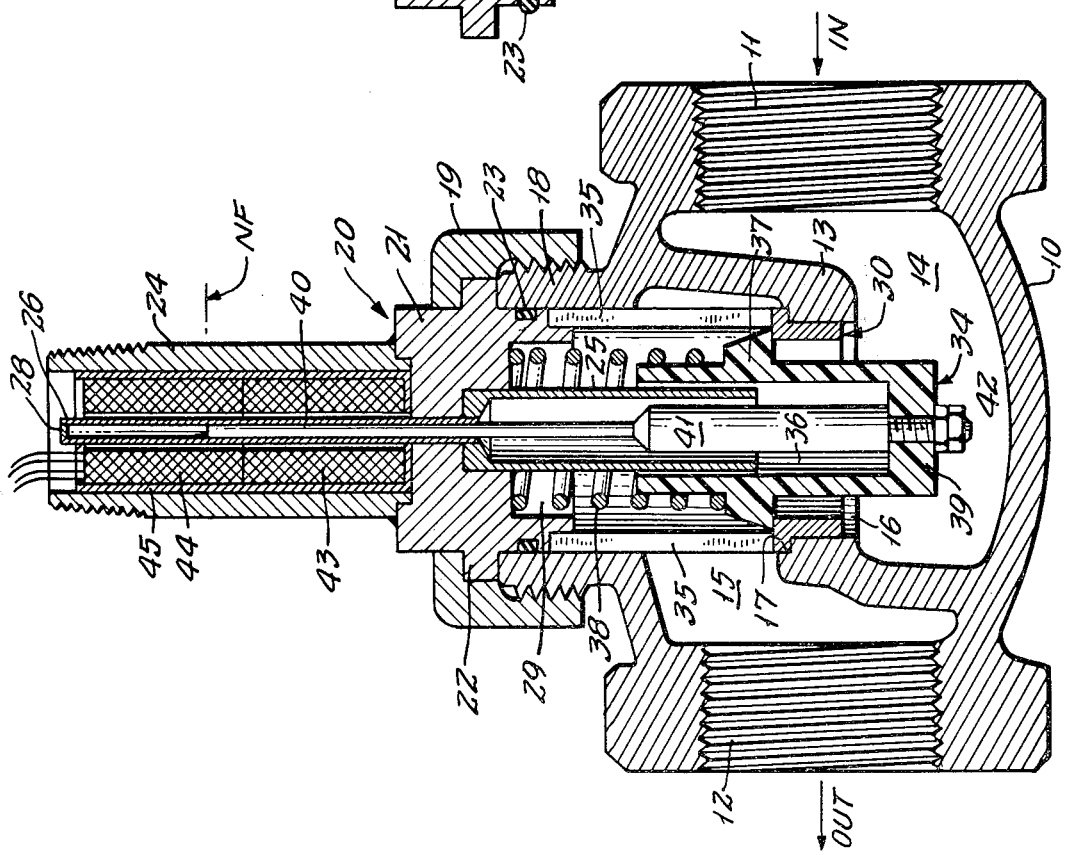

FLOW-RATE TRANSDUCER WITH ELECTRICAL OUTPUT

This application is a continuation-in-part of our copending application, Ser. No. 117,791, filed Feb. 1, 1980.

BACKGROUND OF THE INVENTION

The invention relates to fluid-flow responsive devices which produce an electrical output in response to such flow.

So far as we are aware, past devices of the character indicated employ a valve-member element which is diplaced in response to fluid flow, and a predetermined displacement is monitored by an on/off electrical element, such as a magnetic-reed switch. Such devices are exemplified by U.S. Pat. No. 2,892,051 and No. 4,081,635. Necessarily, such devices are limited as indicators of the onset or existence of a pre-specified flow rate, and the only way to obtain response to more than one flow rate is to employ more than one magnetic switch, at one or more further locations selected to be measures of the respective further flow rates for which electrical response is desired. At best, only a step-function response is achievable, and a hysteresis factor is present to preclude identity as between the electrical response to increasing flow-rate conditions, when compared to the electrical response to decreasing flow-rate conditions.

BRIEF STATEMENT OF THE INVENTION

It is an object of the invention to provide an improved flow-rate responsive device of the character indicated, avoiding deficiencies and limitations of past devices.

Another object is to provide such a device which will produce a substantially linear electrical response to fluid-flow rate.

A further object is to provide such a device with optional adaptability to flow measurement in one direction and a flow measurement in either of two directions.

A specific object is to provide such a device essentially as an optional insert subassembly adapted for incorporation in existing or standard valve-body configurations.

Another specific object is to meet the immediately preceding object with a structure wherein the insert subassembly is one of a plurality of subassemblies, each unique to a different range of flow rates, so that the same body can be readily equipped or serviced to serve a selected or changed variety of flow rates, without body disconnection from existing pipe or conduit means.

A still further specific object is to provide a reliable electrically responsive indicator of liquid flow rate, particularly suited for small flow rates, e.g., in the order of 1 to 10 gallons per hour, as encountered in small power boat or other power vehicle operation.

Another object is to meet the foregoing objects with structure which is inherently simple and essentially hysteresis-free, and which is characterized by reliable performance and ease of maintenance.

The foregoing and other objects and features of the invention are achieved in a valve-like structure adapted for series-connection in a pipe or other conduit line and having a valve member which is caused, within the constraint of rectilineal guide means, to change its longitudinal position as a substantially linear function of the change of fluid-flow rate in the pipe or conduit. As inductive device tracks the position of the valve member to produce an electrical output signal which is also a substantially linear function of the fluid-flow rate. In a first illustrative embodiment, the indicated structure and function are incorporated into a check valve, wherein the flow-monitoring direction is in the "flow" direction of the check valve. In a second embodiment, the indicated feature is operative whatever the direction of flow, and the electrical output signal is indicative of both the direction and the rate of flow.

DETAILED DESCRIPTION

Illustrative embodiments of the invention will be described in conjunction with the accompanying drawings, in which:

FIG. 1 is a vertical sectional view through a fluid-flow device of the invention, wherein flow is monitored only in the flow direction right-to-left, in the sense of the sectional view;

FIG. 2 is a vertical sectional view through the bonnet assembly, being part of the device of FIG. 1;

FIG. 3 is a perspective view of a body-mounted part of the device of FIG. 1;

FIG. 4 is a view in elevation, alongside and to the scale of FIG. 2, of the flow-displaceable subassembly, being another part of the device of FIG. 1;

Figure 5:
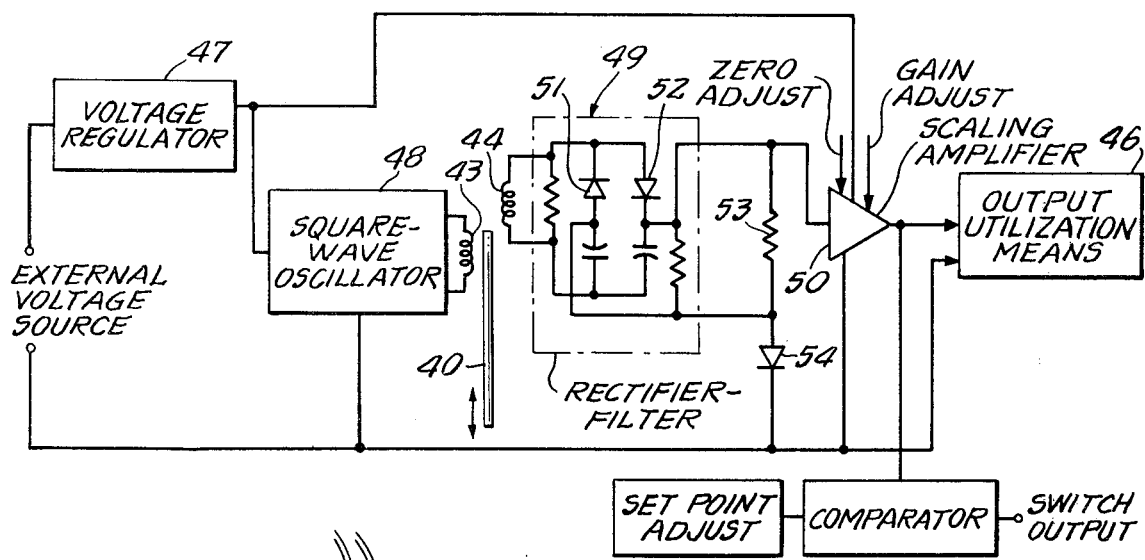
FIG. 5 is an electrical block diagram, schematically showing electrical components associated with the device of FIG. 1.

In FIG. 1, the invention is shown in application to a conventional valve body 10, which is generally a metal casting having an inlet port 11 and an outlet port 12, both shown with threads as for standard-pipe connection thereto. Within body 10, a bridge 13 divides the interior volume into an upstream chamber 14 served by inlet port 11 and a downstream chamber 15 served by outlet port 12. The central part of bridge 13 is generally horizontal, at substantially the elevation of the axis common to ports 11–12, and a seat bore 16 with a counterbore 17 at its upper end is formed in the central part of bridge 13, on a vertical alignment which preferably intersects the horizontal alignment of ports 11–12.

The body 10 includes an upstanding boss portion 18 having a straight cylindrical bore to the downstream chamber 15 and on the same vertical-alignment axis as that of bore 16 and counterbore 17, and a bonnet-clamp nut 19 engages the threads of boss 18. A bonnet assembly 20 includes a circular base 21 having a radially outward flange 22 which seats on the open end of boss portion 18 and which is clamped in place upon threaded advance of nut 19 on boss 18. An elastomeric O-ring 23, retained in a peripheral groove beneath flange 22, seals the bonnet assembly 20 to the bore of boss 18 when flange 22 is clamped as described. The bonnet assembly is best seen in FIG. 2 and further includes an upstanding cylindrical conduit boss 24 for threaded-fitting connection to standard electrical conduit (not shown), boss 24 being brazed in its connection to base 21, as suggested by a circumferential fillet in the drawing. From a central bore of base 21, a tubular stem 25 extends downwardly, and another tubular member or sleeve 26 extends upwardly, for substantially the longitudinal extent of the conduit boss 24; as shown, the upper or base end of stem 25 is closed except for a central bore to which the lower end of sleeve 26 is fitted, and the upper end of sleeve 26 is permanently closed by a plug 28. The parts 25, 26, 28 are preferably sealed at their fit to each other and constitute a stem subassembly which is then assembled to and sealed at its fit to a counterbore of base 21. Thus, when the bonnet assembly 20 is clamped by the bonnet nut 19, the bonnet assembly 20 constitutes a fluid-tight sealed closure of the bore of boss 18.

Description of the bonnet-assembly 20 is completed by noting a downwardly open counterbore 29 for spring-locating purposes to be described, and by noting that the sleeve 26 is of non-magnetic material, such as thin stainless-steel tubing, for purposes which will become clear.

When the bonnet assembly 20 is clamped in place, as described, a calibrating seat member 30 is retained in place. Seat member 30 is seen in FIG. 3 to be essentially a sleeve with a large-diameter elongate upper end portion 31 and a reduced lower end portion 32. The lower-end portion 32 locates in the bridge or seat bore 16, and the base end of the upper-end portion 31 locates in the adjacent counterbore 17; and the upper end of portion 31 locates on the reduced and shouldered end 27 of the bonnet base 21. At juncture of portions 31-32, and within portion 31, an annular seating surface 33 is defined, to provide a bottom-stop and valve closing function, in cooperation with a valve member or shuttle 34, to be later described; and upward from the plane of surface 33, the upper-end portion 31 is characterized by plural slots 35, of preferably constant width, unless a particularly characterized valve action is desired, in which case slot (35) width varies as a function of axial elevation to accord with the desired characteristic.

The valve member or shuttle 34 is essentially an elongate cup, having a bore 36 which derives longitudinally slidable guidance from telescoping overlap with the bonnet stem 25. An integrally formed circumferential flange 37 characterizes the longitudinally central portion of shuttle 34 and is of outside diameter to radially clear the bore of seat member 30 (at 31) but nevertheless large enough for assurance of circumferentially continuous seating overlap with surface 33, for a zero-flow condition; and a relatively weak coil spring 38 is shown seated in the bonnet counterbore 29 and continuously urging shuttle 34 to its seated position. The lower end of shuttle 34 extends substantially below the seating flange 37 and has a closure wall 39 by which it is connected to means for tracking the instantaneous position of shuttle 34. The latter connection establishes a longitudinally positionable subassembly, best shown in FIG. 4.

In FIG. 4, the movable subassembly is seen to comprise an elongate core element or rod 40, of high magnetic permeability, secured at one end, by silver brazing to the bored upper end of a connecting rod 41, of non-magnetic material such as brass. Rod 41 has a reduced end which is threaded and projects with radial clearance through a central hole in the shuttle wall 39, to enable axially secure fastening, via lock nuts 42, with a measure of freedom for self-alignment adaptability for rod 40 in stem 26. The core element 40 is slidably positionable within sleeve 26, and when shuttle 34 is seated at 37-33, the upper end of the core element 40 is at the elevation denoted N.F. in FIG. 1, meaning the no-flow condition. When in this position, core element 40 is totally lapped with a first (43) of two like coils 43-44; in this position, core element 40 is also partially lapped with the second coil 44, as shown. Coils 43-44 are shown fitting in end-to-end abutting relation within a cup-shaped coil shield 45, in telescoped overlap with the sleeve 26, and all fully contained within the cylindrical inner volume of the conduit boss 24 of the bonnet assembly 20. Leads to respective coils 43-44 are shown extending through the open end of conduit boss 24, for wire-nut or other wiring connection to external electrical components of the electrical circuit.

The coils 43-44 and core element 40 are operative components of a linearly variable differential transformer (L.V.D.T) wherein the coil 43 is the primary and is therefore continuously excited, at constant voltage. As long as the shuttle 34 remains seated, the upper end of core element 40 remains at the elevation N.F. and therefore provides substantially no coupling to coil 44. However, with upward shuttle displacement, core element 40 becomes progressively more linked to the secondary coil 44, while remaining fully linked to the primary coil 43. Thus, the amplitude of secondary voltage becomes a direct linear measure of the extent of coupling of core element 40 to the upper coil 44.

We have obtained reliable operation using a core element 40 of high-permeability material, which is either Allegheny-Ludlum alloy #4750 or Carpenter #49-FM, and which has been machined to cylindrical shape, 2.25 inches long, by 0.01-inch diameter, the same having been annealed in a dry-halogen atmosphere, after machining. Each of the cells was one-inch long, being 5700 turns of #42 enameled copper wire; and the shield 45 has been of Mu-metal per AMS-7701, also hydrogen-annealed for optimum magnetic properties.

FIG. 5 is illustrative of a battery-operated circuit for providing output-utilization means 46, such as an indicating meter or recorder, with a d-c voltage, say in the range 0 to 10 volts, and having an amplitude which is a linear function of the displaced condition of core element 40 with respect to its seated (N.F.) position. In this circuit, a voltage regulator 47 having a 12-volt output enables the L.V.D.T. device to operate from an unregulated source of any convenient voltage, say in the range of 15 to 30 volts d-c. The output of regulator 47 supplies a square-wave oscillator 48, which may be a solid-state switch to chop the regulated voltage at, say, 800 Hz nominal frequency, the chopped voltage being applied directly to the lower of primary coil 43. The voltage induced in the upper or secondary coil 44 is full-wave rectified and filtered at 49, and the filtered output is processed in a scaling amplifier 50, for delivery to the output means 46.

By judicious choice of oscillator frequency, a reasonable square wave will be obtained across the secondary coil 43. Such a waveform enables the recitifer-filter 49 to tolerate moderate distortion due to frequency drift and changes in core position.

It is desirable to use a simple rectifier-filter circuit, using Schottky-type diodes 51–52, such as the common full-wave voltage doubler. However, this entails a voltage drop across the rectifier diodes 51–52, when conducting, that is significant compared to the filtered d-c voltage, here shown appearing across a resistor 53. Since the rectifier voltage drop is temperature-sensitive, the filtered d-c voltage is temperature-sensitive to an unacceptable extent. However, the voltage drop across a rectifier diode at constant current is predictable; it decreases linearly with increasing temperature. This being the case, and for a given displacement condition of core element 40, the filtered d-c voltage which appears across resistor 53 will, in the absence of other considerations, increase with increasing temperature. We offset this temperature-dependence by so connecting another diode 54 that its voltage drop will be summed with the filtered d-c voltage across resistor 53, and it is therefore the voltage sum across 53–54 which is supplied for processing at amplifier 50. Since this summation takes place prior to the gain stage (50), the temperature compensation is independent of such gain adjustments as may be provided at 50.

The amplifier circuit 50 may use a commercially available integrated-circuit operational amplifier, for example, the RCA product coded CA3130.

The circuit configuration is chosen (a) to offer negligible loading to the rectifier-filter 49, (b) to amplify the temperature-compensated d-c signal, and (c) to provide adjustability of zero balance and gain; preferably, the amplifier is of the type known as a "follower with gain". Such an amplifier is preferred because its output is stable with temperature, due to the large amount of negative feedback inherent in the circuit. Amplifier drift is essentially equal to the magnitude of drift in the associated resistive components (not shown), which can be made small by choice of components.

In operation, fluid flow in the inlet-to-outlet direction will cause upward displacement of shuttle 34, from its no-flow seated relation to the annular surface 33. The flange 37 is preferably of tapering external contour, so that the effective flow orifice will be determined essentially only by the lower edge of flange 37 with respect to the sum of the then-open extents of the slots 35. Such upward displacement is therefore essentially a linear reflection of instantaneous flow rate, and it has been explained that the electrical output to means 46 is likewise essentially a linear reflection of the upward displacement and is, therefore, also a linear reflection of instantaneous flow rate.

Figure 6:
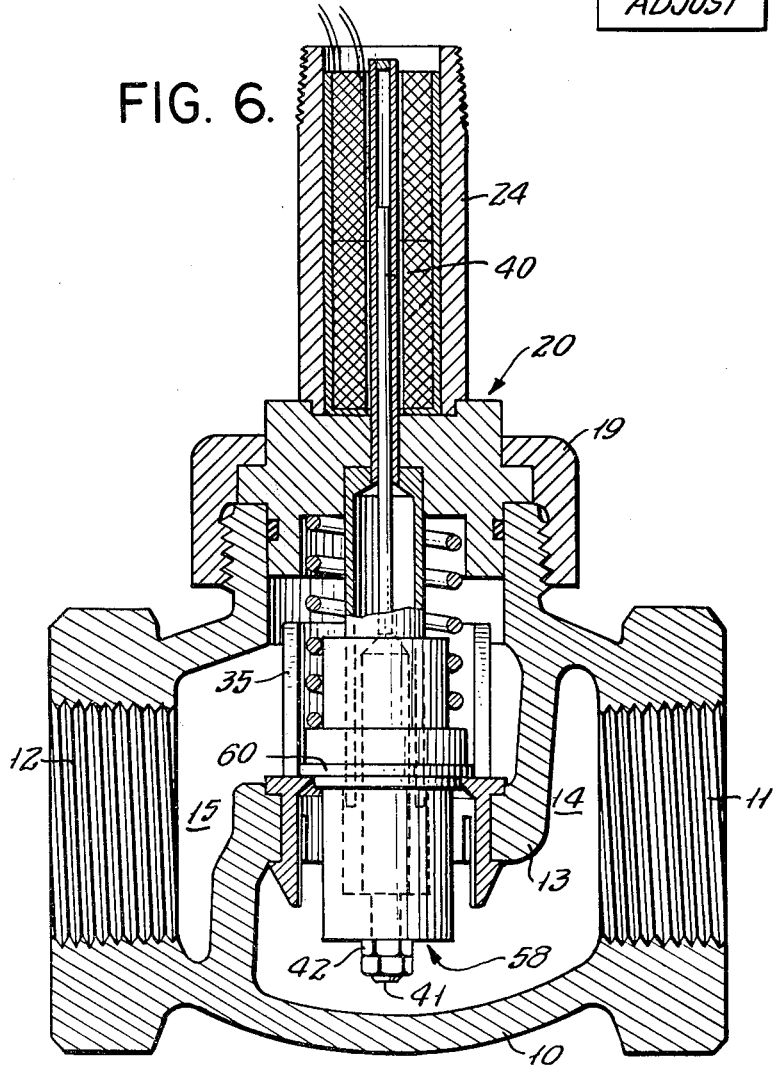
FIG. 6 is a view similar to FIG. 1, to show an alternative construction.
Figure 7:
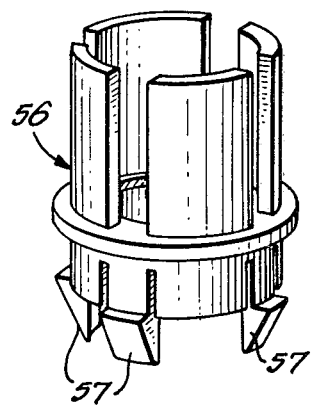
FIG. 7 is a perspective view of a body-mountable part of the device of FIG. 6.

FIG. 6 illustrates a modification of the device of FIG. 1, wherein the calibrating seat member 56 is configurated for snap-in retention by the seat bridge 13 of the valve body, thus avoiding the need for upper-end stabilization by abutment with bonnet structure. As best seen in FIG. 7, the seat member incorporates plural spring fingers 57 at angularly spaced locations, said fingers having cam-sloped surfaces to cause transient inward deflection in the course of insertion into the seat bore 16 and counterbore 17; at achievement of full insertion, locking barb abutments of fingers 57 snap outwardly into retaining engagement with the bottom surface of bridge 13, at bore 16. Within the seat member 56, a shuttle or valve member 58 may be as described at 34, but in the form shown shuttle 58 has a generally cylindrical body, stepped only by a radially short flange 59 to provide a shoulder for coaction with spring 38, the valve-member coaction with the flow-calibrating slots of seat member 56 being via a relatively thin annular disc 60, secured as by snap-ring means against the lower shoulder of flange 59. To achieve the snap-action retention described via fingers 57, the seat member 56 is desirably a single injection-molded part, as of polypropylene or Delrin. It will be appreciated that such snap action facilitates application of the invention to existing, installed valve bodies, and that for greatest flexibility of such use, the reduced threaded end of connecting rod 41 is preferably even more extensive than depicted in FIG. 3, to enable a greater range of ultimate accommodation of the N.F. location of core element 40, for the particular valve-body dimensions which happen to apply.

The arrangements thus far discussed have involved what is essentially a check valve, accommodating flow only in the inlet-to-outlet direction, being the flow-measuring direction. The arrangement of FIG. 8 illustrates that the invention is also applicable to measurement of flow in either of the two possible directions (11-to-12, or 12-to-11), with an indication of which of these directions is currently applicable.

Figure 8:
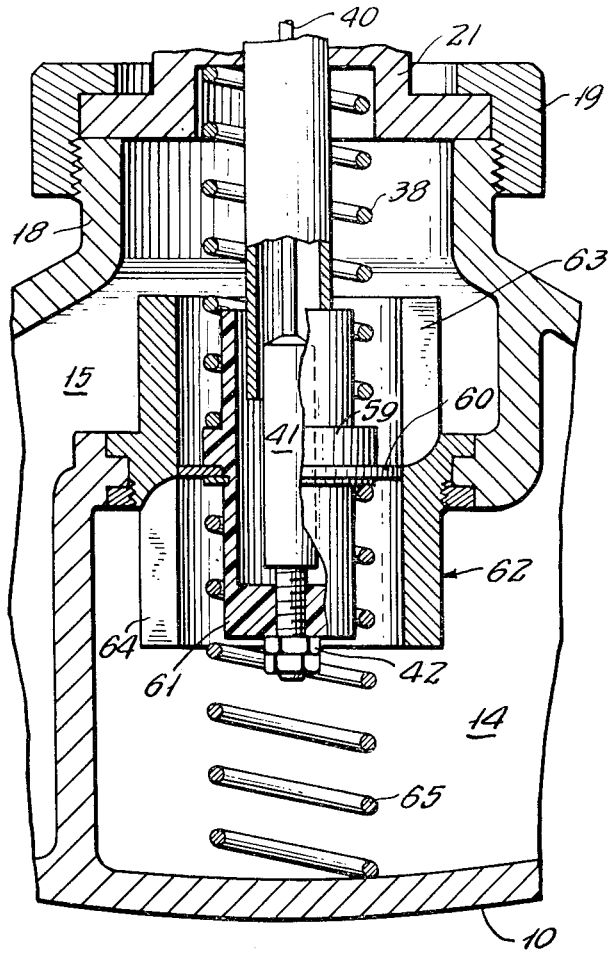
FIG. 8 is a view similar to FIG. 1, to show a further embodiment, with inherent capability to monitor flow in either of two possible directions of flow.
Figure 9:
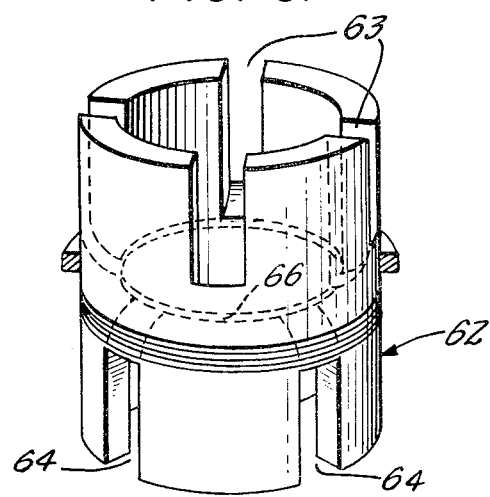
FIG. 9 is a perspective view of a body-mountable part of the device of FIG. 8.

In FIG. 8, a calibrating seat member 62 is characterized by a continuous cylindrical bore which extends above and below a central no-flow zone of coaction with a valve-member disc 60. Inlet-to-outlet flow will elevate the associated shuttle 61 and its disc 60 to expose orifices provided by an upper series of calibration slots 63, and outlet-to-inlet flow will depress the shuttle and its disc 60 to expose orifices provided by a lower series of calibration slots 64, shown in FIG. 9 to be in angularly staggered interlace with the slots 63. A second relatively weak spring 65 reacts with the shuttle in opposition to spring 38 to assure a nominal force for valve-member placement in the central or no-flow zone 66 of seat member 62, in the absence of any flow, it being understood that said zone 66 is of relatively short axial extent (axially between slots 63 and 64), corresponding to substantially the effective axial thickness of the rim of disc 60.

To utilize the described L.V.D.T. coils 43–44 in the bidirectional system of FIG. 7, the core element 40 is so adjusted in its connection to the valve-member shuttle that when disc 69 is in the no-flow zone of seat member 62, the upper end of core element 40 is in a mid-position of coupling to the secondary coil 44. In that case, it will be understood that, without any circuit modification, (a) output of amplifier 50 may at a no-flow level be a fixed intermediate voltage (e.g., 5 volts d-c), that (b) for inlet-to-outlet flows, the output voltage at 50 may be in the range 5 to 10 volts, and that (c) for reversed flow (outlet-to-inlet) the output voltage at 50 may be in the range 10 to 5 volts. Of course, it will be further understood that with suitable provision for a constant 5-volt negative offset in conjunction with the output of amplifier 50, the voltage supplied to means 46 may be 0 to 5 volts positive for inlet-to-outlet flows, and 0 to 5 volts negative for outlet-to-inlet flows. In either event, the direction and the magnitude of the fluid flow are reported to means 46 via the output voltage from amplifier 50.

The embodiment of FIGS. 10 to 13 is particularly adapted to provide an electrical output signal (via L.V.D.T. structure already described) for inherently small rates of liquid flow, as for example encountered in fuel flow to a gasoline engine, wherein it may be desired to continuously indicate the rate of fuel consumption, illustratively gallons per hour, in the range of 1 to 10 gallons per hour. In the device of FIGS. 10 to 13, fuel in the line to a carburetor (not shown) is forced to flow through the tapered slots of a lightweight piston or poppet 70, rather than through slots of a fixed cylindrical guide (as in the previously described embodiments); the effective area of such tapered slots changes as a function of poppet displacement, in response to changes in flow rate.

Figure 10:
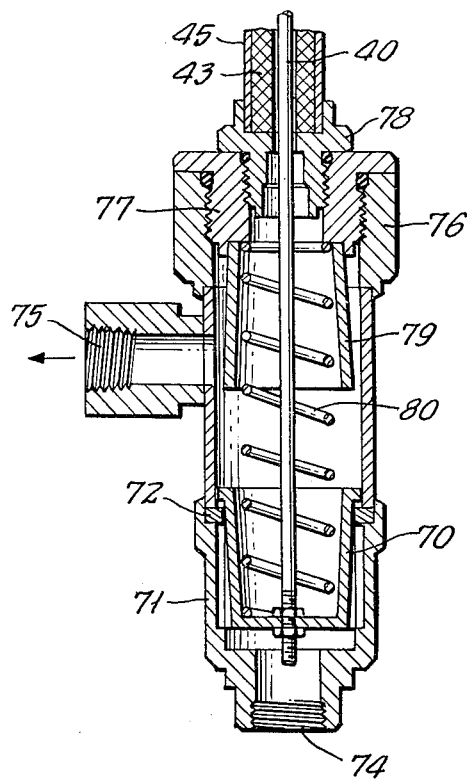
FIG. 10 is a fragmentary vertical sectional view through valve structure of a still-further embodiment.

More specifically, in the device of FIG. 10 an elongate tubular valve body comprises a lower or inlet member 71 with a counterbore at its upper end for concentric mounting of an annular disc or seat member 72 as well as for telescopic fit to an upper or outlet member 73. The bores of members 71–73 are cylindrical and of substantially the same diameter, so that seat member 72 provides a circular seat opening, dividing an inlet chamber from an outlet chamber. The described body structure is intended for vertically upright mounting, with inlet-port connection at threads 74 in the reduced lower end of member 71, and with outlet-port connection at threads 75 of a side-port fitting to the outlet-chamber member 73; this arrangement assures against air entrapment within the device, the same being totally filled upon any start-up of the associated engine. The upper end of body member 73 is fitted with an internally threaded adapter 76, for selective removable mounting of a cap or bushing 77, providing in turn for selectively removable mounting of a bonnet fitting 78, which is the base of L.V.D.T. components 43–45, already described. Depending from adapter 76 is a tubular member 79 which acts (1) as an upper-limit stop, for maximum upward displacement of poppet 70 and (2) as a centering retainer for the upper end of a spring 80, lightly loading poppet 70 toward its lower or no-flow position. The parts 71–72–73, 73–76, and 77–79 are permanently secured to each other, as by solder or brazing, and the removably threaded fits at 76–77 and at 77–78 are sealed by elastomeric O-rings, as shown.

Figure 11:
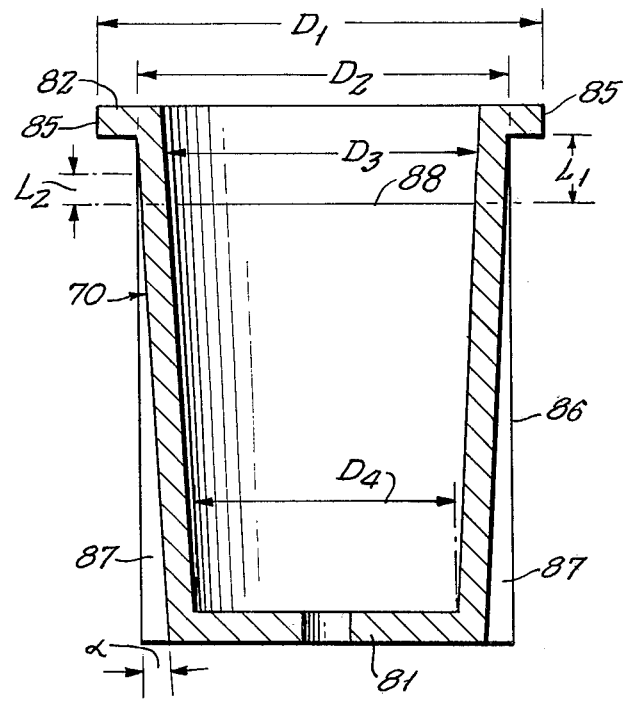
FIG. 11 is an enlarged vertical sectional view through the valve member or poppet of the embodiment of FIG. 10.
Figure 13:
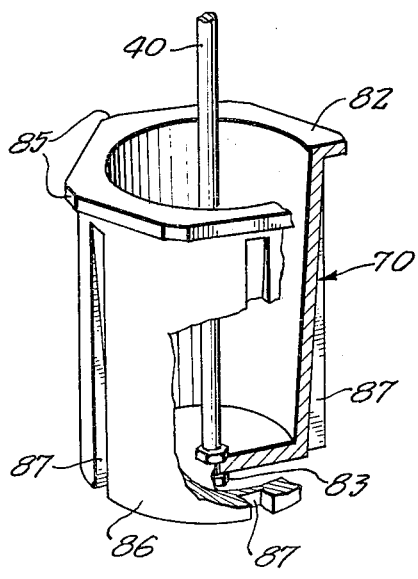
FIG. 13 is a perspective view, partly broken away, to show the valve member of FIGS. 11 and 12, with a position-tracking connection thereto.
Figure 12:
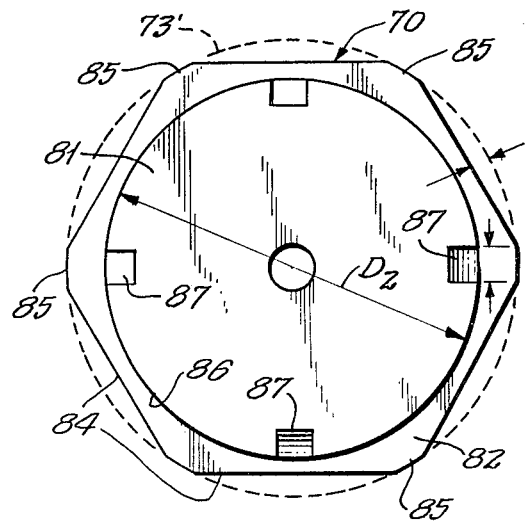
FIG. 12 is a bottom end view of the valve member of FIG. 11.

As best seen in FIGS. 11 to 13, the poppet valve member 70 is cupped, with a closure wall 81 at its lower end and a circumferential radially outward flange 82 at its open upper end; the lower threaded end of the core rod 40 is secured at a central opening in wall 81, by clamp nuts 83. Truncation flats 84 along the periphery of flange 82 establish spaced feet 85 by which the upper end of poppet 70 derives concentric stabilizing guided support in the cylindrical bore of outlet-chamber member 73; the span $D_1$ (see FIG. 11) of such feet 85 will be understood to have a running fit to the cylindrical guide bore provided by member 73, and in FIG. 12, the cylindrical profile of said guide bore is suggested by dashed lines 73'. The remaining exterior surface 86 of poppet 70 is cylindrical, of diameter $D_2$, having close running clearance with the bore diameter of the seat member 72. The bore within poppet 70 is convergent from a maximum open-end diameter $D_3$ to a closed-end minimum diameter $D_4$; the diameter of spring 80 is selected for concentric end location at the minimum diameter $D_4$, so that hysteresis effects due to other spring contact with poppet 70 can be avoided. In similar fashion, the upper end of spring 70 preferably locates to the same diameter $D_4$ at the convergent upper end of the tubular stop 79.

In accordance with a feature of the invention, one or more elongate flow-characterizing tapered slots (of varying area) are defined by and between the seat member 72 and the particular poppet region which is adjacent to member 72, the effective slot area being a linear function of poppet elevation for any given flow-rate condition between ports 74–75. As shown, grooves 87 in the poppet surface 86 establish the slots; each groove is of constant width W, commencing with zero depth at an upper elevation 88, and tapering with uniform slope $\alpha$ and increasing depth to a maximum, at the closed end of poppet 70. Preferably, the elevation 88 at which grooves 87 commence to taper is at such axial offset $L_1$ beneath flange 82 as to exceed the thickness of seat member 72; such thickness is suggested by phantom lines, at spacing $L_2$ in FIG. 11, for the no-flow condition. In the latter circumstance, i.e., for the no-flow condition wherein poppet 70 is in seated abutment with part of the reduced lower end of body member 71 (see FIG. 10), the poppet flange 82 axially clears seat member 72, as shown in FIG. 10.

In order that flange 82 shall have insignificant response to fluid flow, the total trucated area, i.e., all areas between flats 84 and the arcs 73' subtended thereby should very substantially exceed the maximum total effective area of the flow-characterizing slots, i.e., when poppet 70 is in its "full-open" position of abutment with stop 79. And the indicated axial offset ($L_1$ minus $L_2$) between flange 82 and seat member 72 in the no-flow condition will be seen to contribute to isolation of flange 82 from flow response, even for the smallest of flows.

In a fuel flow-rate device as described in connection with FIGS. 10 to 13, friction-reduction is of utmost importance. To this end, we have obtained satisfactory low-hysteresis operation, in the case of gasoline fuel, using a brass seat member 72 and a poppet 70 that is of hard-anodized aluminum (so-called 6061-T6), with Teflon being added by vacuum-impregnation of the porous surface after hard-coating. For a poppet diameter $D_2$ of ⅝-inch, a stainless-steel spring 80 was selected to provide a preload force of 1.1 ounces, for the no-flow or seated position, and electrical output was linear for the fuel-flow range from 1 to 10 gallons per hour, for both increasing flow rates and decreasing flow rates, and with negligible hystersis; four metering grooves 87 were provided of ⅛-inch width and 0.040-inch maximum depth, tapering over an axial length of approximately 0.7 inch. The indicated 1 to 10 gallons per hour device will thus be seen to serve gasoline-fueled marine engines of horsepower ratings in the range 13 to 130 horsepower.

In operation of the described devices, no warm-up time is needed, in view of the solid-state nature of the circuitry. In the case of FIG. 10 apparatus, the circuit will be understood to be connected for excitation via a starter-switch contact. Thus, immediately upon starting the engine, a meter indicator (at 46, FIG. 5) may display a flow rate of 10 or more gallons per hour for a few seconds, reflecting the fact that an initial surge of gasoline occurred, to make up for fuel that may have drained from the carburetor float bowl, due to non-use of the engine over a period of time. But such a surge is in no way harmful to the flow meter or its indicator system. Then too, a harmless transient high-flow surge may also occur when an engine that has been running at a high power setting is suddenly throttled back to a near-idle condition; the resulting high-flow surge indication lasts but a few seconds and reflects the stabilizing accommodation of float-bowl level to the newly reduced engine-operating condition.

While the invention has been described in detail for preferred embodiments, it will be understood that modifications may be made without departure from the scope of the invention.

What is claimed is:

1. A fluid-flow responsive electric transducer, comprising a valve body having a fluid passage between an inlet and an outlet, said body including seat structure having a circular opening and dividing said passage into an inlet chamber and an outlet chamber, guide means including a cylindrical-bore formation in fixed adjacent relation to said seat structure and within said outlet chamber, said bore formation being coaxial with and of greater radius than said seat opening, a cupped piston structure having a cylindrical outer surface portion in close clearance relation with the seat opening, said piston structure having a closed end in the inlet chamber and an open end exposed to the outlet chamber, said piston structure having at its open end a radially outward flange in guided engagement with said bore formation, one of said structures having an elongate slot of predetermined flow-characterizing width in such coacting adjacency with the other of said structures that with piston-member displacement away from a seated no-flow position the effective slot opening increases as a substantially linear function of such displacement, whereby over the slotted region, said piston member will be longitudinally displaced as a substantially linear function of rate of flow for a given fluid in said passage, and electrical transducer means including a part connected to said piston and a part mounted to said body and producing an electrical output signal having a varying parameter which is a substantially linear function of piston displacement.

2. The transducer of claim 1, in which said guide means is part of said seat structure and the elongate slot is a formation in the cylindrical-bore formation of said guide means.

3. The transducer of claim 1, in which the elongate slot is a formation in the cylindrical outer surface of said piston structure.

4. The transducer of claim 1, in which the elongate slot is a groove of uniform width and of effective depth which increases substantially uniformly as a function of piston-structure displacement from seated position.

5. The transducer of claim 1, in which said guide means is a tubular part of said seat structure, said tubular part extending into said outlet chamber and in radial clearance with adjacent wall portions thereof, said slot being of uniform width along said tubular part and open through the radial thickness of said tubular part.

6. The transducer of claim 1, in which said slot is one of a plurality of like slots in angularly spaced relation.

7. The transducer of claim 1, in which said valve body comprises a tubular inlet-chamber portion in axially aligned adjacency with a tubular outlet-chamber portion, said seat structure comprising a radially inward flange coaxial with and at the location of adjacency of said chamber portions, said guide means being the bore of said outlet-chamber portion.

8. The transducer of claim 7, in which said tubular inlet-chamber portion has a reduced end remote from said outlet-chamber portion, said piston structure having limiting abutment with said reduced end in its seated position.

9. The transducer of claim 8, in which the flange of said piston structure is in axial clearance with said seat structure when in its seated position, said flange having an angularly local peripheral truncation whereby piston-guided coaction with said guide means is at angularly spaced locations.

10. The transducer of claim 9, wherein the net effective truncated area substantially exceeds the maximum effective slot opening for maximum piston-structure displacement from seated position.

11. The transducer of claim 8, wherein spring means located in said outlet chamber and referenced to said body is in coaxially aligned preloading relation with said piston structure.

12. The transducer of claim 11, in which the bore of said piston structure is characterized by convergence to minimum diameter at its closed end, said spring being of diameter to locate at said minimum diameter and to radially clear the remainder of the bore of said piston structure.

13. The transducer of claim 1, in which the body-mounted part of said electrical-transducer means includes two like elongate multi-turn coils in longitudinal adjacency on the alignment of piston guidance, and in which the piston-connected part of said electrical-transducer means includes an elongate core of high magnetic-permeability material and of substantially constant section displaceable within said coils, the effective longitudinal extent of said core and of each of said coils being substantially the same.

14. The transducer of claim 13, and including a shield sleeve of magnetically shielding material in telescoped longitudinal overlap with both said coils.

15. The transducer of claim 13, and including a square-wave oscillating source connected to excite one to the exclusion of the other of said coils, and piston-displacement detector means including a rectifier connected to the other to the exclusion of said one coil.

16. The transducer of claim 13, in which an elongate isolation tube of non-magnetic material extends within said coils and over the combined length thereof, said tube being closed at its end remote from said seat structure having sealed connection at its other end to said body, said magnetic core being movable within said tube, whereby said coils are effectively isolated from fluid within said body.

17. A flow-rate metering transducer for producing an electrical output in accordance with currently detected rate of liquid flow, comprising an elongate tubular body with a cylindrical bore and with a radially inward flange dividing the interior of said body into an inlet chamber on one side of said flange and an outlet chamber on the other side of said flange, said flange defining a circular metering opening between said chambers and concentric with the axis of said body, inlet-port means and outlet-port means for series-connection of liquid to be metered, a poppet having a cylindrical external surface that is axially movable in close radial clearance within the opening of said flange between a zero-flow axial position to a maximum-flow axial position of coaction with said flange, said poppet surface having an angularly local elongate groove of substantially constant width and of depth which varies as a substantially linear function of axial location, such depth varying from zero at the no-flow axial position to maximum depth at the maximum-flow axial position, and electrical transducer means including a part connected to said poppet and a part mounted to said body and producing an electrical output signal having a varying parameter which is a substantially linear function of poppet displacement.

* * * * *